(12) United States Patent
Koike et al.

(10) Patent No.: US 6,217,184 B1
(45) Date of Patent: Apr. 17, 2001

(54) LIGHT SOURCE DEVICE WITH UNIFORMITY IN COLOR TEMPERATURE OF EMISSION

(75) Inventors: Yasuhiro Koike, 534-23, Ichigao-cho, Aobu-ku, Yokohama-shi, Kanagawa 225-0024 (JP); Akihiro Horibe, Yamato (JP)

(73) Assignees: Enplas Corporation, Kawaguchi; Yasuhiro Koike, Yokoyhama; Nitto Jushi Kogyo Kabushiki Kaisha, Tokyo, all of (JP)

( * ) Notice: Subject to any disclaimer, the term of this patent is extended or adjusted under 35 U.S.C. 154(b) by 0 days.

(21) Appl. No.: 09/190,022

(22) Filed: Nov. 12, 1998

(30) Foreign Application Priority Data

Nov. 19, 1997 (JP) .................................................. 9-334909

(51) Int. Cl.$^7$ ........................................................ F21V 7/04
(52) U.S. Cl. ............................ 362/31; 362/558; 362/559; 362/560; 362/561
(58) Field of Search .............................. 362/31, 558, 559, 362/560, 561

(56) References Cited

U.S. PATENT DOCUMENTS

| 5,542,017 | * | 7/1996 | Koike | ................................... 385/123 |
| 5,881,201 | * | 3/1999 | Khanarian | ............................ 385/146 |

* cited by examiner

Primary Examiner—Stephen Husar
Assistant Examiner—John A. Ward
(74) Attorney, Agent, or Firm—Staas & Halsey LLP

(57) ABSTRACT

A light source device outputs illumination light with highly uniform tint. The light source device is comprises a scattering guide provided with scattering power inside, a light supplier to supply light to an end face portion of the scattering guide. Light is introduced into the scattering guide plate to be followed by emission from an emission face of the scattering guide. Scattering efficiency is intentionally balanced in a long wavelength region and in a short wavelength region so that regions near the end face and far from the end face are approximately equal in color temperature of output light. Relation between Q(R), efficiency in a long wavelength region, and Q(B), scattering efficiency in a short wavelength region, are designed so that k=Q(B)/Q(R) falls within a range $0.75 \leq k \leq 1.25$.

4 Claims, 11 Drawing Sheets

LIGHT SOURCE DEVICE WITH UNIFORMITY IN COLOR TEMPERATURE OF EMISSION

BACKGROUND OF THE INVENTION

1. Field of Invention

The present invention relates to a light source device of a type such that emission is outputted by way of a scattering guide and, in particular, to the device of said type capable of providing an improved uniformity in color temperature of emission. The light source device in accordance with the present invention is applied advantageously to backlighting of display such as liquid crystal display, display for advertising or decoration. Besides, the present invention is applicable advantageously not only to backlighting but also to various illumination devices of other types.

2. Related Art

A known type of light source device employs a scattering guide provided with an end face portion to which light is supplied and a side portion from which illumination light is emitted. Employable scattering guides have shapes such as wedge-plate, flat plate with uniform thickness and rod-shape.

FIG. 1 is a broken perspective view illustrating a light source device which employs a wedge-plate-like scattering guide (called "scattering guide plate", hereafter). Such a type of light source device is called "light source device of side light type" since a primary light source for light supply is disposed beside the scattering guide.

Referring to the figure, light source device 1 comprises a scattering guide 2 having a wedge-shaped cross section beside which a primary light source 3 is disposed.

The primary light source 3 is composed of, for instance, a cold cathode lamp 9 and a reflector 10. The light source device further comprises a reflection sheet 4, prism sheets 5, 6, which are arranged laminatedly together with the scattering guide 2. When the light source device 1 is applied to backlighting of a liquid crystal display, a liquid crystal display panel 7 is disposed on the outside.

The primary light source 3 includes a cold cathode lamp (fluorescent lamp) 9 backed by a reflector 10. The reflector 10 has an opening through which illumination light is supplied to a side end face 2a of the guide plate 2. The reflector 10 is, for instance, made of a sheet having regular or irregular reflectivity. The scattering guide plate 2 having a wedge-shaped cross section is, for instance, an injection moldings made of an acrylic resin (PMMA resin). Illumination light is introduced into the scattering guide plate 2 propagates with repeating reflections at a major face, along which the reflection sheet 4 is disposed (called "back face", hereafter), and at another major face, along which the prism sheet 5 is disposed (called "emission face", hereafter).

At every chance of the reflections, components having incidence angles smaller than the critical angle with respect to the emission face is emitted from the emission face and the back face. Illumination light outputted from the emission face has a principal propagation direction inclined toward the distal end of the wedge-shape. This property is called "emission directivity".

The reflection sheet 4 is a sheet-like regular reflection member such as metal foil or a sheet-like irregular reflection member such as white PET film. The reflection sheet 4 reflects illumination light leaked from the back face of the scattering guide 2 to return the light into the scattering guide 2, thereby improving utilization efficiency of illumination light.

The prism sheets 5 and 6 are disposed to correct emission directivity of the scattering guide 2 and are light-permeable sheets made of, for instance, polycarbonate. Prismatic surfaces of the prism sheets 5, 6 are formed on faces (inside face) directed to the scattering guide plate 2 or on faces (outside face) opposite with the scattering guide plate 2. Each prismatic surface consists of a great number of projection rows running generally in parallel with each other.

If two prism sheets 5, 6 are employed as illustrated, one prism sheet 5 (or 6) is orientated usually so that its projection rows are in line with an incidence face of the scattering guide plate 2. And the other prism sheet 6 (or 5) is orientated usually so that its projection rows run perpendicularly to the incidence face (end face receiving light supply) of the scattering guide plate 2.

Each projection row of the prism sheet 5 and 6 is provided with slopes which corrects a principal emitting direction of emission toward the frontal direction of the emission face. A single prism sheet may be employed or, in some cases, no prism sheet may be employed. Otherwise may be employed a so-called double-prism-faced sheet having prismatic surfaces on both faces.

Furthermore, the scattering guide 2 may be like a uniform-thick plate alternatively. However, viewing from a standpoint of light utilization efficiency, wedge-shape is preferably adopted as in the illustrated example. In general, the wedge-shaped scattering guide 2 has a tendency such that thickness decreases according to distance from the end face portion 2a which receives light supply.

One of performances requisite to such a type of light source device is uniformity in tint of emission. That is, it is desired that the emission face of the scattering guide plate 2 provides emission which is even in tint over an area wide as possible. However, a conventional light source devices as above-described is not enough to answer this requirement. And some unevenness remains in the output light from the scattering guide plate or in the final output emitted by way of an additional element such as a prism sheet.

Careful observation on the emission face 2 employed in the conventional light source device 1 brought a finding that unevenness in tint has a certain tendency. That is, unevenness in tint tends to appear as a variation of tint depending on distance from the end face portion 2a.

For the sake of explanation, the emission face is divided into three areas, neighbouring area 2b near to the end face portion 2a, remote area 2d far from the end face portion 2a and intermediate area 2c located between them. According to observation, difference in tint is great between the neighbouring area 2b and the remote area 2d while the intermediate area 2c gives a transitive tint. Going into details, the remote area 2d provides emission which looks to be insufficiently bluish as compared with emission from the neighbouring area 2b. The greater depth of the scattering guide plate 2 viewed from the light supply side is, the more remarkable such a tendency is.

Such insufficiency of bluishness has been recognized already to some extent. According to an prior art, blue component of light supplied from the primary light source 3 is reinforced. But this provides no essential solution to the problem of unevenness in tint and may give excessive bluishness to the neighbouring area 2b.

According to another prior art, a blue-coloring agent is additionally contained in the scattering guide plate 2. This manner provides no essential solution either. Graded density may be employed in adding of the blue-coloring agent. However, it is disadvantageous to production technology and costs much.

Such a problem of unevenness in tint can rises in light source devices which employ scattering guides having other shapes. FIG. 2 illustrates a light source device which employs a rod-shaped scattering guide (scattering guide rod). The illustrated light source device 11 comprises a cylindrical scattering guide rod 12 having an end face 12a beside which a primary light source (e.g. fluorescent lamp) 13 is disposed. And the primary light source 13 supplies light to the scattering guide rod 12. Emission is outputted from a side face of the cylinder and a distal end face 12e.

This light source device 11 also shows unevenness in tint, which has tendency similar to that shown in the case of the light source device 1 illustrated in FIG. 1.

For the sake of explanation, the side face of the scattering guide 12 providing a cylindrical emission face is divided into three areas, neighbouring area 12b near to the end face portion 1 2a, remote area 12d far from the end face portion 12a and intermediate area 12c located between them.

Difference in tint is great between the neighbouring area 12b and the remote area 12d (and the distal end face 12e). In the intermediate area 12c gives a transitive tint. Going into details, the remote area 12d (and distal end 12e) provides emission which looks to be insufficiently bluish as compared with emission from the neighbouring area 12b. The greater length (i.e. depth viewed from the light supply side) of the scattering guide rod 12 is, the more remarkable such a tendency is.

SUMMARY OF INVENTION

An object of the present invention is to overcome the above-described problem of unevenness in tint, having the above-mentioned tendency, which rises in light source devices of a type such that emission is outputted by way of a scattering guide. That is, the present invention aims to improve evenness in tint of emission. Through this improvement, the present invention also aims to give improved evenness in tint to backlighting arrangements for various displays such as liquid crystal display and to illumination devices of other types.

The present invention is applied to a light source device which comprises a scattering guide provided with scattering ability inside and a light supplier to supply light to an end face portion of the scattering guide, wherein the scattering guide introduces light inside and provides emission from an emission face. The emission face is formed as to include at least a part of a side portion of the scattering guide.

According to a feature of the present invention, the light supplier supplies visible light including rays in a long wavelength region and in a short wavelength region while scattering ability of the scattering guide is subject to a condition regarding a relation between Q(R), scattering efficiency in the long wavelength region, and Q(B), scattering efficiency in the short wavelength region. This condition is set to balance-adjust so that positions near the end face portion to which light is supplied and positions far from the end face portion are approximately equal in color temperature of emission from the emission face.

In a preferred embodiment, the relation between Q(R), scattering efficiency in the long wavelength region, and Q(B), scattering efficiency in the short wavelength region, is expressed by use of the following relation formula (6) including adjusting ratio k for balance-adjusting and said adjusting ratio k falls within a range $0.75 \leq k \leq 1.25$:

$$Q(B)/Q(R)=k \quad (6),$$

where Q(B) is scattering efficiency in blue light representing the short wavelength region and Q(R) is scattering efficiency in red light representing the long wavelength region.

Typical shapes of the scattering guide are a plate-like shape and rod-shape. If a plate-shape is employed, thickness of the plate preferably tends to decrease according to distance from the end face portion which receives light supply.

The present invention overcome the problem of unevenness in tint which might rise in light source devices of a type such that emission is outputted by way of a scattering guide and reduces unevenness in tint of emission depending on distance from a light-supplied-end.

And through this, improved evenness in tint is realized in backlighting arrangements for various displays such as liquid crystal display and in illumination devices of other types. Further, even if depth viewed from the light-supplied-end is increased, unevenness in tint will be hard to appear. Accordingly, light source devices having emission faces provided with comparatively large depth can be realized without involving unevenness in tint.

More details and features of the present invention will be understood by the following description with referring to the drawings.

DETAILED DESCRIPTION OF THE INVENTION

Figure 1:
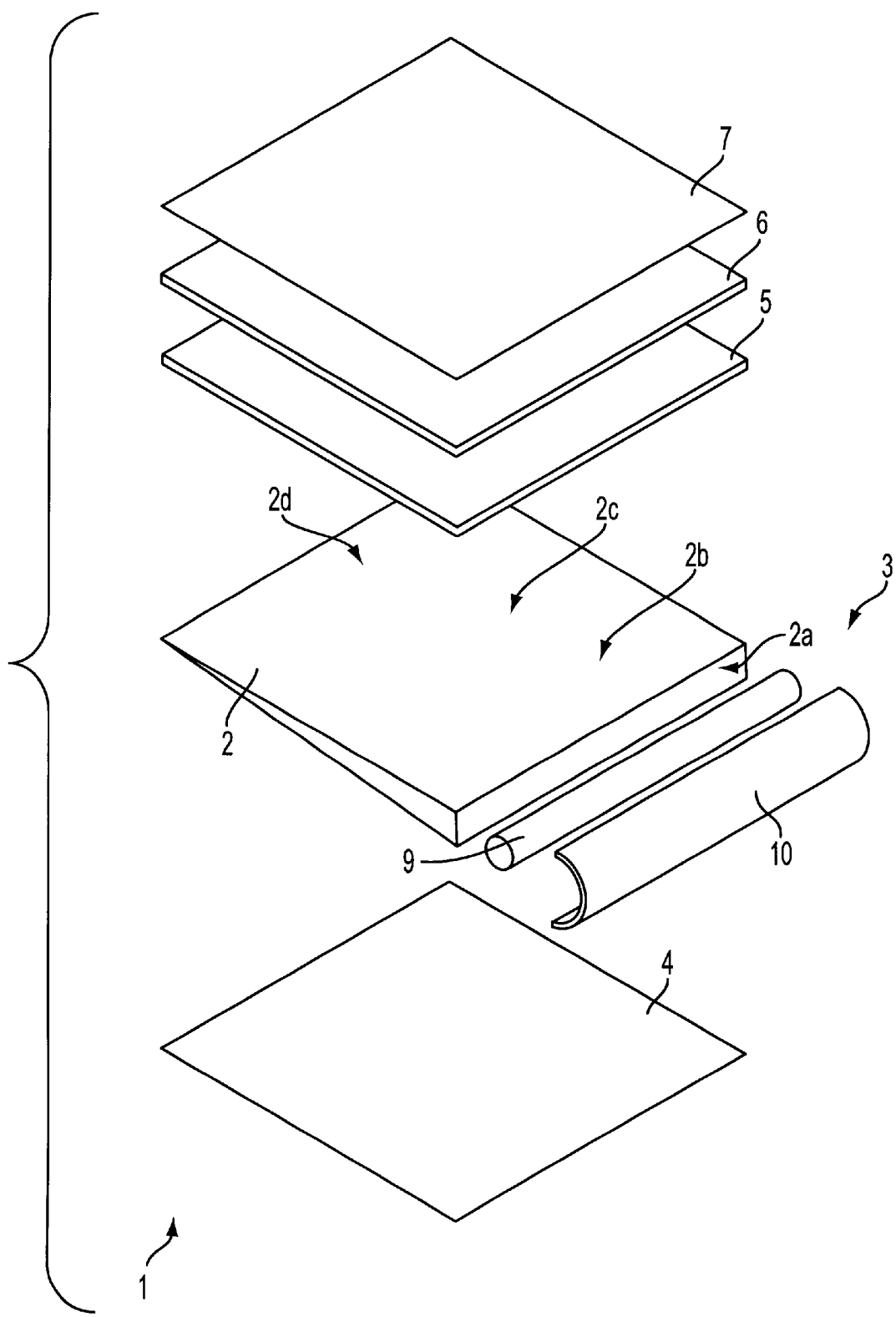
FIG. 1 is a broken perspective view to illustrate a constructive outline of a light source device which employs a wedge-shaped and plate-like scattering guide (scattering guide plate)

First, the theory of Mie-scattering which gives a theorical basis to the present invention is explained briefly as follows. According to the theory of Mie-scattering, Maxwell's electromagnetic equation is resolved for a case such that a medium (matrix) having a uniform refractive index contains spherical particles having a refractive index different from that of the medium.

The theory teaches that the formula (1) below gives intensity distribution I ($\alpha,\theta$) depending on angles of scattering light. Scattering efficiency K($\alpha$) is expressed by the formula (2) below. Here, $\alpha$ is expressed by the formula (3) below and is a quantity corresponding to radius r of the individual spherical particles (scatters) which is normalized by wavelength $\lambda$ of light in the matrix. Angle $\theta$ expresses a scattering angle in a manner such that $\theta=180$ degrees means a direction which is the same as that of incidence light propagation.

Formula (4) below gives $i_1$ and $i_2$ included in the formula (1). And a and b with foot-suffix $\nu$ in the formulas (2) to (4) are given by the formula (5) below. P (cos $\theta$) with top-suffix 1 and foot-suffix $\nu$ expresses Legendre polynomials. It is to be noted that a and b with foot-suffix $\nu$ consist of primary and secondary Recatti-Bessel functions $\psi\#$, $\xi\#$ (where $\#$ expresses foot-suffix $\nu$) and their derivatives. Relative refractive index of the scatters with respective to the matrix as standard is expressed by m, defined by a formula $m=n_{scatter}/n_{matrix}$.

$$I(\alpha, \theta) = \frac{\lambda^2}{8\pi^2}(i_1 + i_2) \quad (1)$$

$$K(\alpha) = \left(\frac{2}{\alpha^2}\right)\sum_{\nu=1}^{\infty}(2\nu+1)(|a_\nu|^2 + |b_\nu|^2) \quad (2)$$

$$\alpha = 2\pi r/\lambda \quad (3)$$

$$i_1 = \left|\sum_{\nu=1}^{\infty}\frac{2\nu+1}{\nu(\nu+1)}\left\{a_\nu\frac{P_\nu^1(\cos\theta)}{\sin\theta} + b_\nu\frac{dP_\nu^1(\cos\theta)}{d\theta}\right\}\right|^2 \quad (4)$$

$$i_2 = \left|\sum_{\nu=1}^{\infty}\frac{2\nu+1}{\nu(\nu+1)}\left\{b_\nu\frac{P_\nu^1(\cos\theta)}{\sin\theta} + a_\nu\frac{dP_\nu^1(\cos\theta)}{d\theta}\right\}\right|^2$$

$$a_\nu = \frac{\Psi_\nu'(m\alpha)\Psi_\nu(\alpha) - m\Psi_\nu(m\alpha)\Psi_\nu'(\alpha)}{\Psi_\nu'(m\alpha)\zeta_\nu(\alpha) - m\Psi_\nu(m\alpha)\zeta_\nu'(\alpha)} \quad (5)$$

$$b_\nu = \frac{m\Psi_\nu'(m\alpha)\Psi_\nu(\alpha) - \Psi_\nu(m\alpha)\Psi_\nu'(\alpha)}{m\Psi_\nu'(m\alpha)\zeta_\nu(\alpha) - \Psi_\nu(m\alpha)\zeta_\nu'(\alpha)}$$

It should be noted that scattering efficiency K($\alpha$) given by the formula (2) above is a function depending on ratio of scatter's radius to wavelength, (r/$\lambda$).

This means: (i) if scatter's radius (r) is fixed, scattering efficiency K($\alpha$) depends on wavelength $\lambda$, and (ii) if wavelength $\lambda$ is fixed, scattering efficiency K($\alpha$) depends on scatter's radius r. And relative refractive index m is considered to a parameter which influences these relations indirectly.

The present inventors have inferred that the afore-discussed problem of unevenness in tint comes from the former relation (i). In addition to this, on the basis of the relation (ii), they realized that wavelength dependency of scattering efficiency can be controlled by choosing scatter's radius r under consideration on the parameter m. And they have attained an idea that causes of the afore-discussed unevenness in tint can be suppressed by use of this.

To make a concrete research from such standpoints, they prepared a lamp which has emission spectrum with representative peaks (435 nm, 545 nm and 615 nm) corresponding to blue (B), green (G) and red (R), respectively. Then results shown in FIG. 8 and FIG. 10 have been obtained, which illustrate scattering efficiency K($\alpha$) calculated for scatters of commercially available kinds. Graphs of FIG. 9 and FIG. 11 have been produced by use of these results.

Figure 8:
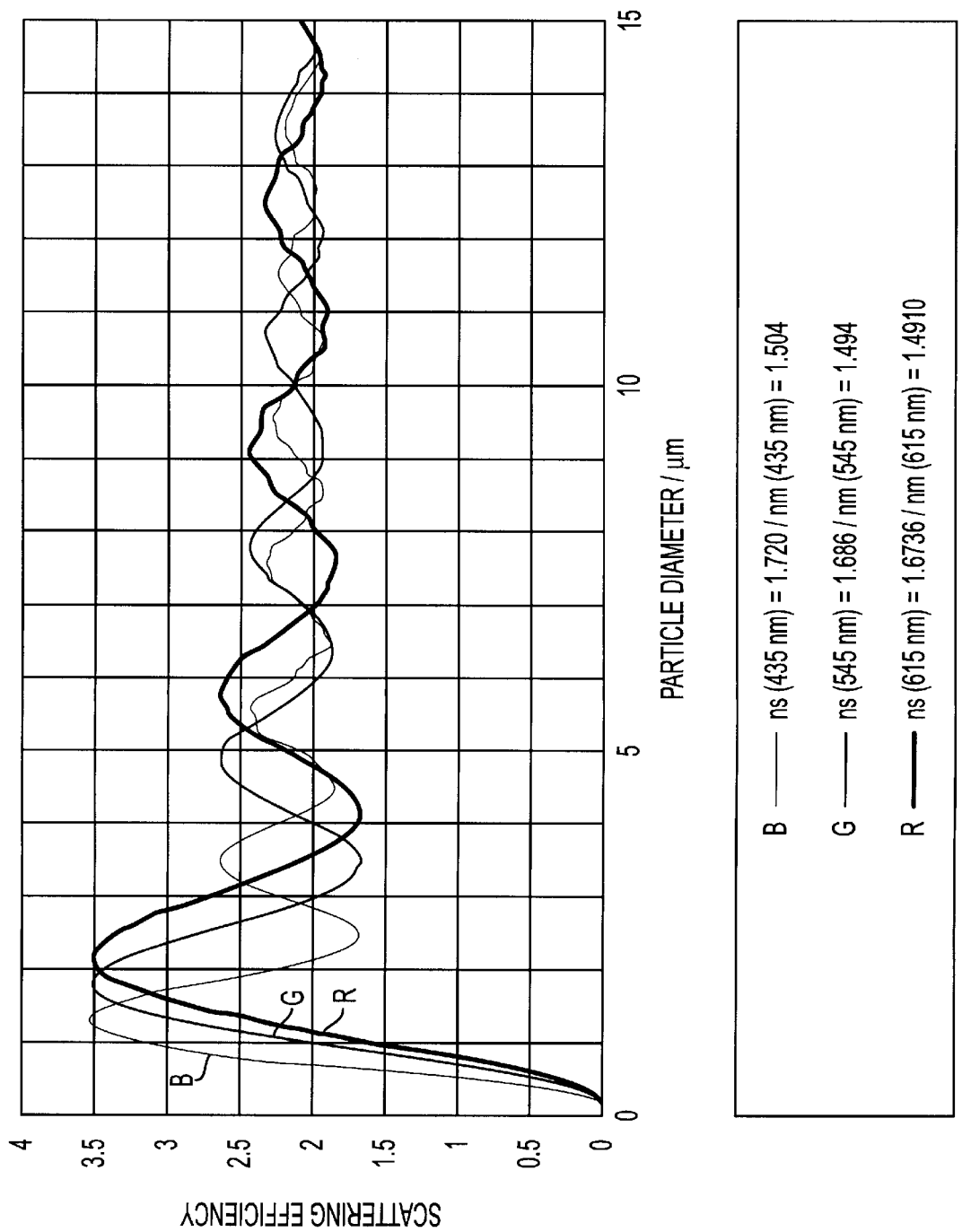
FIG. 8 is a graph of scattering efficiency K(α) which has been calculated on the assumption that scatters of a commercially available kind are employed.

(Graph of FIG. 8)

Abscissa represents particle size (diameter; 2r) and ordinate represents scattering efficiency. Matrix was PMMA {polymethyl methacrylate; $n_D$ (refractive index to 569 nm light)=1.492}. Value of scatters was assumed to be that of EPOSTAR (Registered trade mark; Nippon Shokubai Kagaku Kogyo Co., Ltd. ).

Refractive index has wavelength dispersion and values of 1.720, 1.686 and 1.6736 for the calculation wavelengths 435 nm, 545 nm and 615 nm, respectively.

Figure 9:
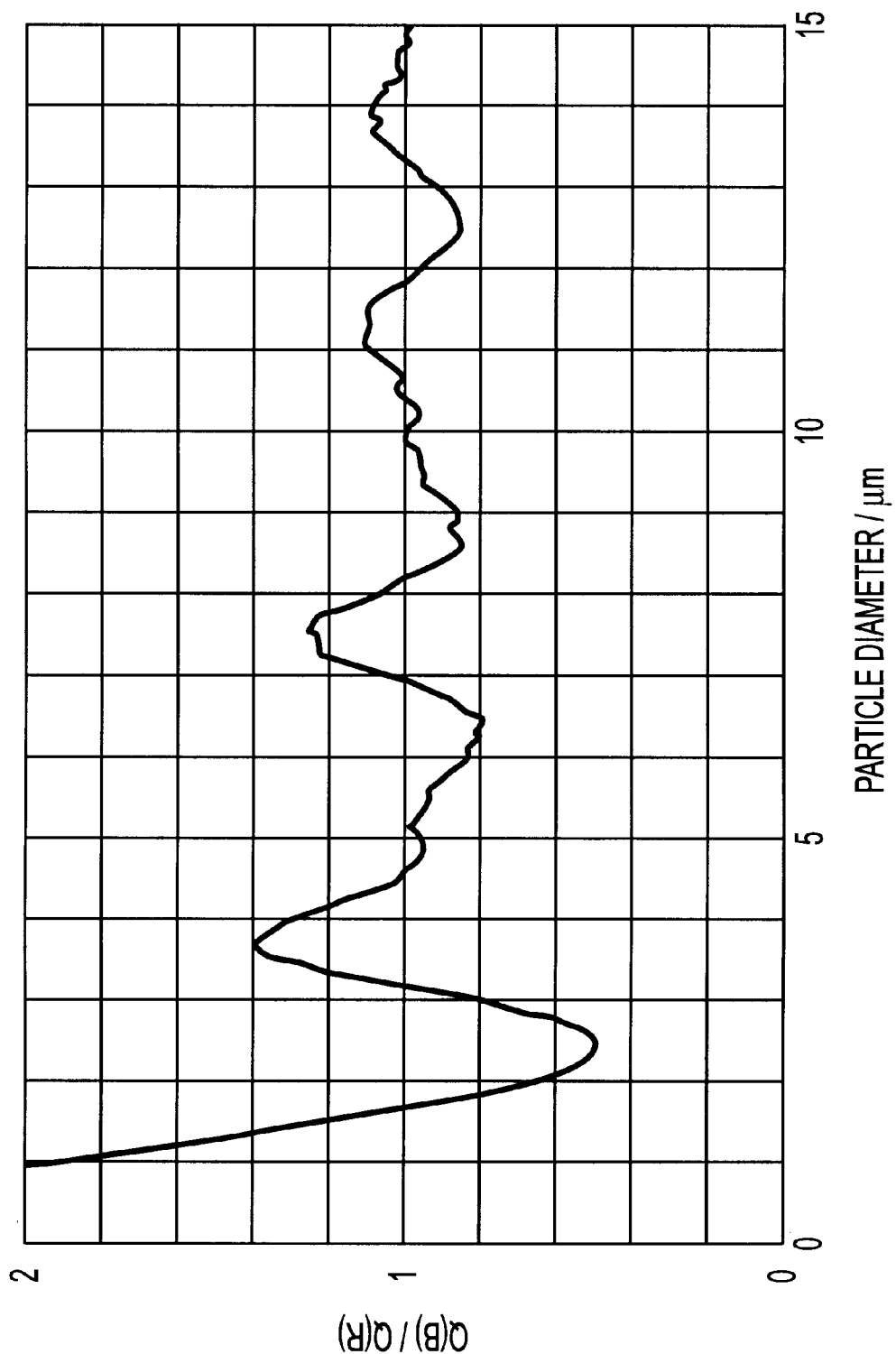
FIG. 9 is a graph of Q(B)/Q(R) plotted with respect to particle radius and according to FIG. 8.

(Graph of FIG. 9)

Ratios of scattering efficiency for blue light B=435 nm to that for red light R=615 nm were plotted in accordance with FIG. 8. A notation Q($\lambda$) using a symbol Q represents scattering efficiency K($\alpha$) regarded as a function of wavelength $\lambda$. And notations of scattering efficiency for blue light B and red light R are Q(B) and Q(R), respectively.

Figure 10:
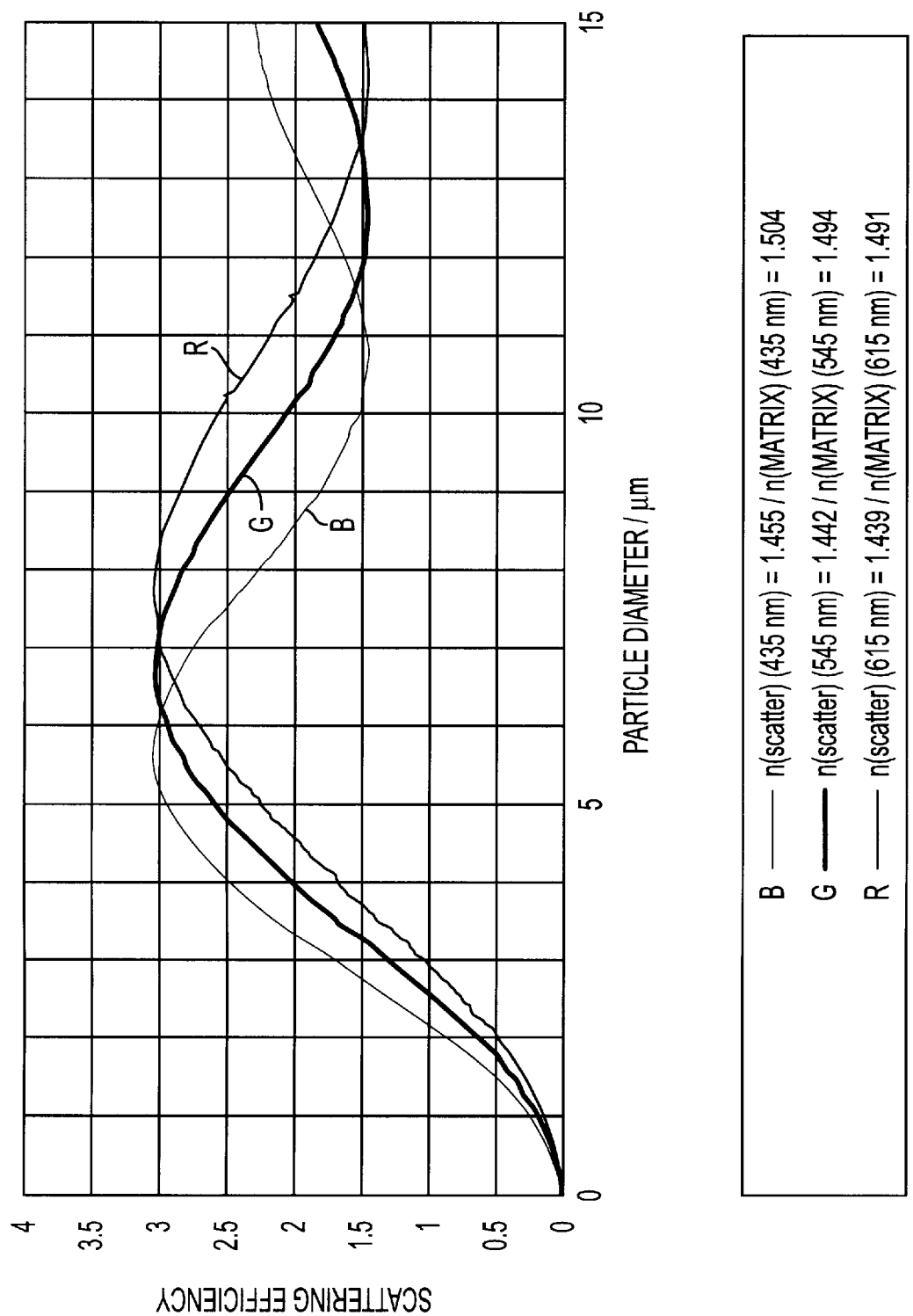
FIG. 10 is a graph of scattering efficiency K(α) which has been calculated on the assumption that scatters of another commercially available kind are employed.

(Graph of FIG. 10)

Abscissa represents particle size (diameter; 2r) and ordinate represents scattering efficiency in the same manner as in the case of FIG. 8. Matrix was PMMA {polymethyl methacrylate; $n_D$ (refractive index to 569 nm light)=1.492}. Value of scatters was assumed to be that of TOSPEARL (Registered trade mark; Toshiba Silicone Co., Ltd. ).

Refractive index has wavelength dispersion and values of 1.455, 1.442 and 1.439 for the calculation wavelengths 435 nm, 545 nm and 615 nm, respectively.

Figure 11:
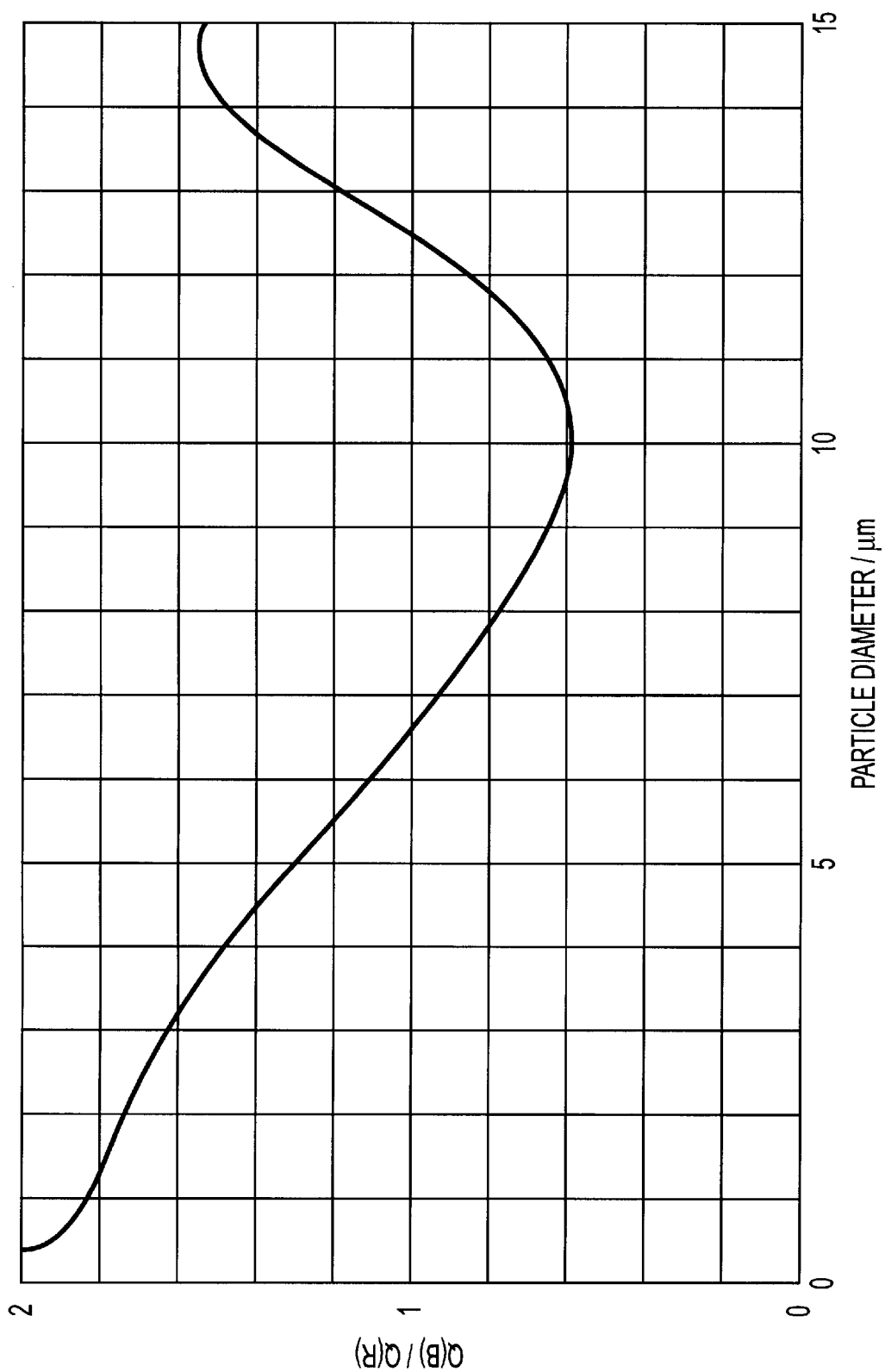
FIG. 11 is a graph of Q(B)/Q(R) plotted with respect to particle radius and according to FIG. 10.

(Graph of FIG. 11)

Ratios of scattering efficiency Q(B) for blue light B=435 nm to that for red light R=615 nm Q(R) were plotted in accordance with FIG. 10.

As understood from FIG. 8 and FIG. 10, curves of the individual colors rise up from zero to give peaks at certain particle sizes and then become oscillatory curves, respectively. It should be noted that the osillatory curves including the risings involve phase delay in order of B, G, R and accordingly Q(B)/Q(R) oscillates around 1.0 as plotted in FIG. 9 and FIG. 11.

Particular attention should be paid to the fact that Q(B) rises up foremost in the smaller side with respect to about 1.5 $\mu$m in the case of FIG. 8. In a similar manner, Q(B) rises up foremost in the smaller side with respect to about 5 $\mu$m in the case of FIG. 10. Such quick risings (FIG. 8, FIG. 10) are reflected to the fact that Q(B)/Q(R) maintains large values over 1.25 within the above-mentioned regions as shown in FIG. 11.

Figure 2:
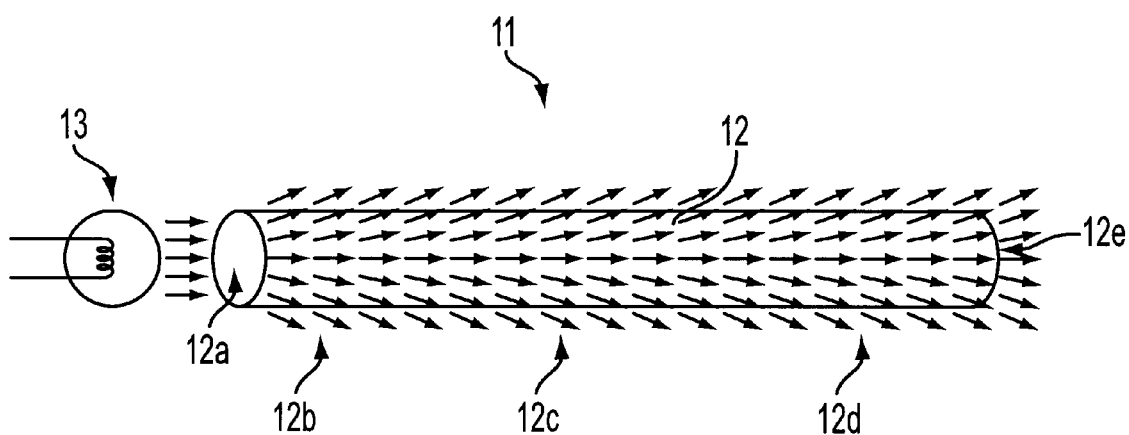
FIG. 2 is a broken perspective view to show a constructive outline of light source device which employs a rod-shaped scattering guide (scattering guide rod)

As understood from the above study, small-sized scatters can fill a condition such that scattering efficiency for blue light is much greater than that for red light. If such scatters are employed in a scattering guide of light source device as illustrated in FIG. 1 or FIG. 2, blue light will be scattered stronger than red light in the neighbouring areas 2b, 12b near to the end faces 2a or 12a on the light supply side. Components incident to the emission face at angles smaller than the critical angle get away from the scattering guide plate 2 or 12 to provide output light. Thus blue light B is consumed rapidly on the way travelling via the intermediate area 2c or 12c to the remote area 2d or 12d. As a result, insufficient blueish tint appears particularly in the remote areas 2d, 12d. This will give a basic mechanism of unevenness in color.

Further, the smaller ratio of scatter size to wavelength ($2r/\lambda$) is, the more effective this mechanism. Because smaller values of ($2r/\lambda$) give stronger back scattering property, as understood from the formula (1), which increases escaping efficiency (probability of clearing the critical angle condition). High scattering efficiency tends to promote directly escaping from the scattering guide plate. This conclusion is maintained basically even if multiple scattering effect is considered.

Attention should be paid to the fact that red light has stronger back scattering property as compared with blue light if scatter particle radius r is kept constant. Taking this into account, it is foreseeable that scattering efficiency of blue light slightly exceeding that of red light will hardly provide unevenness in tint.

Nevertheless, in some cases, good results are obtained when scattering efficiency of blue light is rather lower than that of red light. This is because actually employed scattering guides have matrix containing micro-impurities. Such micro-impurities sometimes scatter and sometimes absorb blue light. Thus, good results may be obtained when scattering efficiency of blue light representing short wavelength region is rather lower than that of red light representing long wavelength region.

The above discussion leads to a reasonable conclusion that unevenness in tint appearing in prior art devices is caused by choice and employment of scatters without taking the above-studied mechanism into account. Under such a background, the present invention prevents phenomena as above-discussed from appearing by means of balancing scattering efficiency of blue light representing short wavelength region and that of red light representing long wavelength region. Examples are studied as follows.

Figure 6:
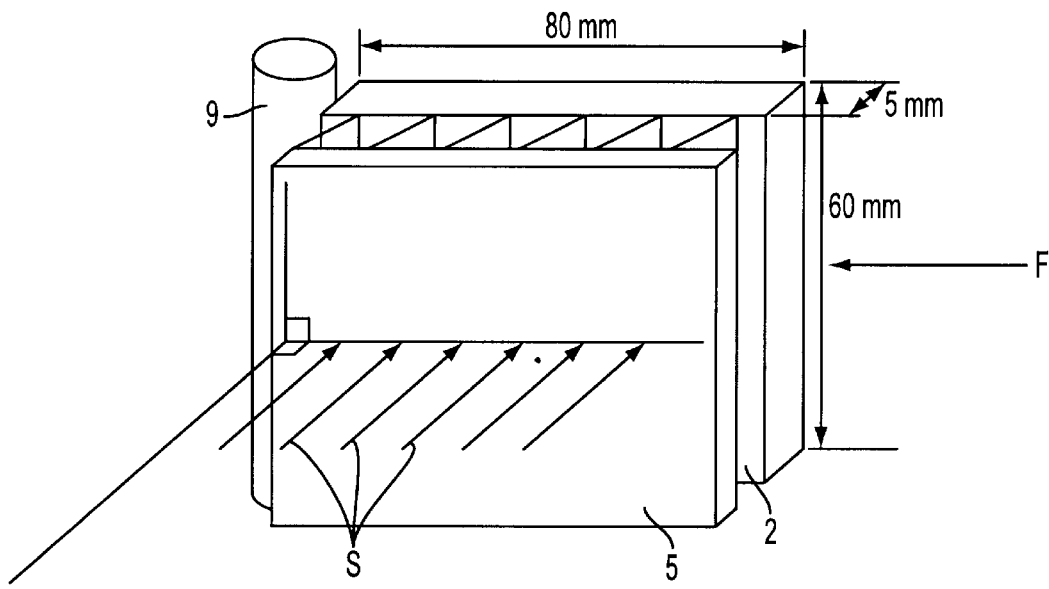
FIG. 6 gives an illustration of an arrangement comprising a flat scattering guide plate with uniform-thickness, a prism sheet disposed on an emission face of the plate and a cold cathode lamp disposed beside an end face of the plate as well as an indication of color temperature measurement direction.

FIG. 6 gives an illustration of an arrangement comprising a flat scattering guide plate 2 with uniform-thickness, a prism sheet 5 disposed on an emission face of the plate and a cold cathode lamp 9 disposed beside a side end face of the plate. Two kinds of samples for the scattering guide plate 2 were prepared. One has PMMA matrix containing TOSPEARLs (Registered trade mark; denoted by T-120) having a particle size of 2.0 μm which is uniformly dispersed in the matrix at 0.09 wt %. The other has PMMA matrix containing EPOSTERs (Registered trade mark) having a particle size of 7.0 μm which is uniformly dispersed in the matrix at 0.05 wt %.

Figure 3:
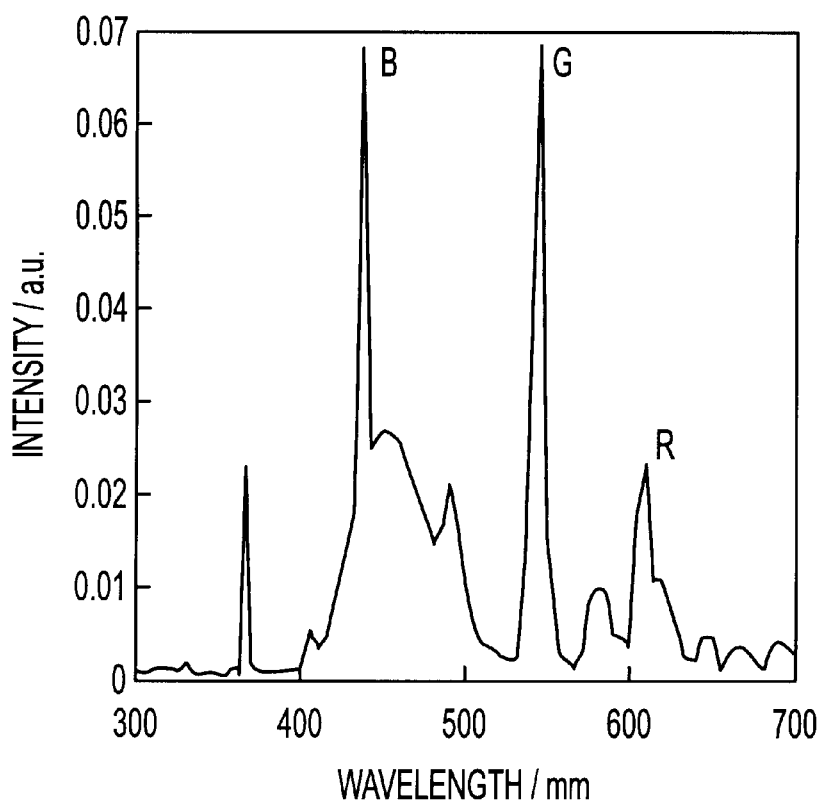
FIG. 3 is an emission spectrum of a cold cathode lamp.
Figure 15:
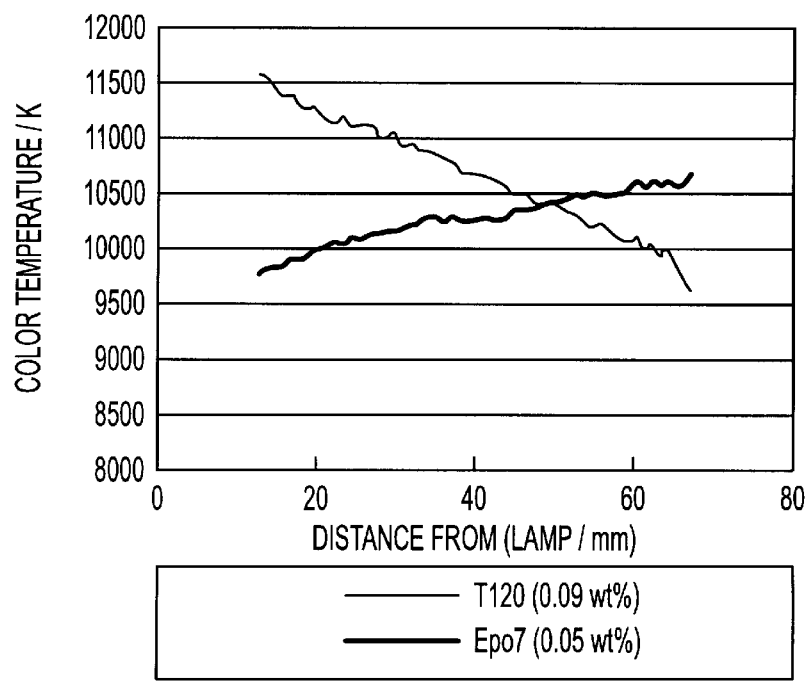

Emission spectrum of the cold cathode lamp 9 is shown in FIG. 3. Color temperature was measured with aiming directions F and S (frontal direction) for these two samples. Results are shown in FIGS. 7 and 15.

Figure 7:
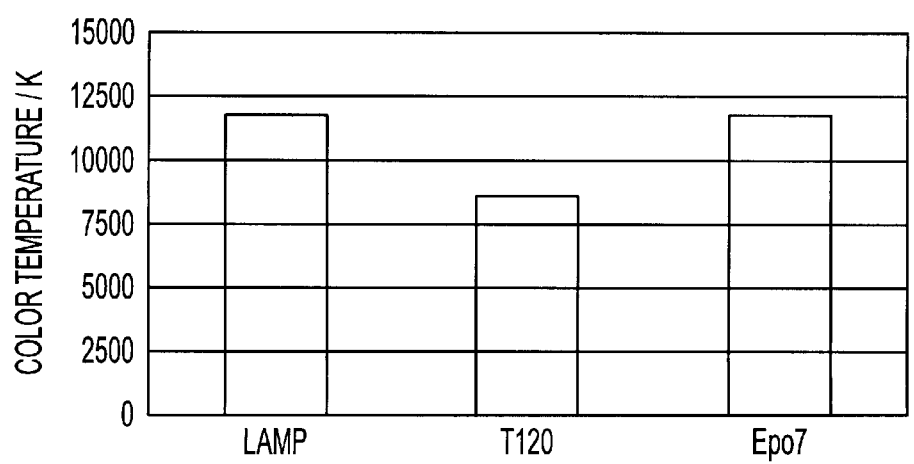
FIG. 7 is a graph showing results of color temperature measurement carried out from direction F for two samples to be used in the arrangement illustrated in FIG. 6.

(Graph in FIG. 7)

Three bars indicate, in order from the left hand, color temperature of the cold cathode lamp 9, color temperature (measured from direction F) of the sample employing TOSPEARL (Registered trade mark) 120 of 2.0 μm in diameter and color temperature (measured from direction F) of the sample employing EPOSTAR (Registered trade mark; Epo 7, hereafter) of 7.0 μm in diameter, respectively.

As understood by comparing these with each other, the latter sample gives better results compared with the former sample. That is, the latter sample maintains color temperature better through scattering and guiding process compared with the former sample.

As seen from FIGS. 9 and 11, Q(B)/Q(R) of the former is about 1.75 and Q(B)/Q(R) of the latter is about 1.0. The former, Q(B)/Q(R)=about 1.75, is supposed to fall in a range such that short of bluish component appears in a distal end portion of the scattering guide plate 2. On the other hand, the latter, Q(B)/Q(R)=about 1.0, means that short of bluish component hardly appears in the distal end portion.

(Graph in FIG. 15)

Two curves are color temperature (measured from direction S) of the sample employing TOSPEARL (Registered trade mark) 120 of 2.0 μm in diameter and that (measured from direction S) of the sample employing EPOSTAR (Registered trade mark) Epo 7 of 7.0 μm in diameter, respectively.

Abscissa represents distance from the end face of light supply side. As understood by comparing these with each other, the former sample gives a rapid reduction in color according to distance from the end face of light supply side. On the other hand, the latter sample gives a gentle rising in color according to distance from the end face of light supply side.

As seen from FIGS. 9 and 11, Q(B)/Q(R) of the former is about 1.75 and Q(B)/Q(R) of the latter is about 1.0. Accordingly, the former, Q(B)/Q(R)=about 1.75, is supposed to fall in a range such that a sharp gradient in color temperature appears along the scattering guide plate 2. On the other hand, the latter, Q(B)/Q(R)=about 1.0, fills a condition under which gradient in color temperature is kept gentle. Thus the latter is defined as the first embodiment of the present invention.

Figure 14:
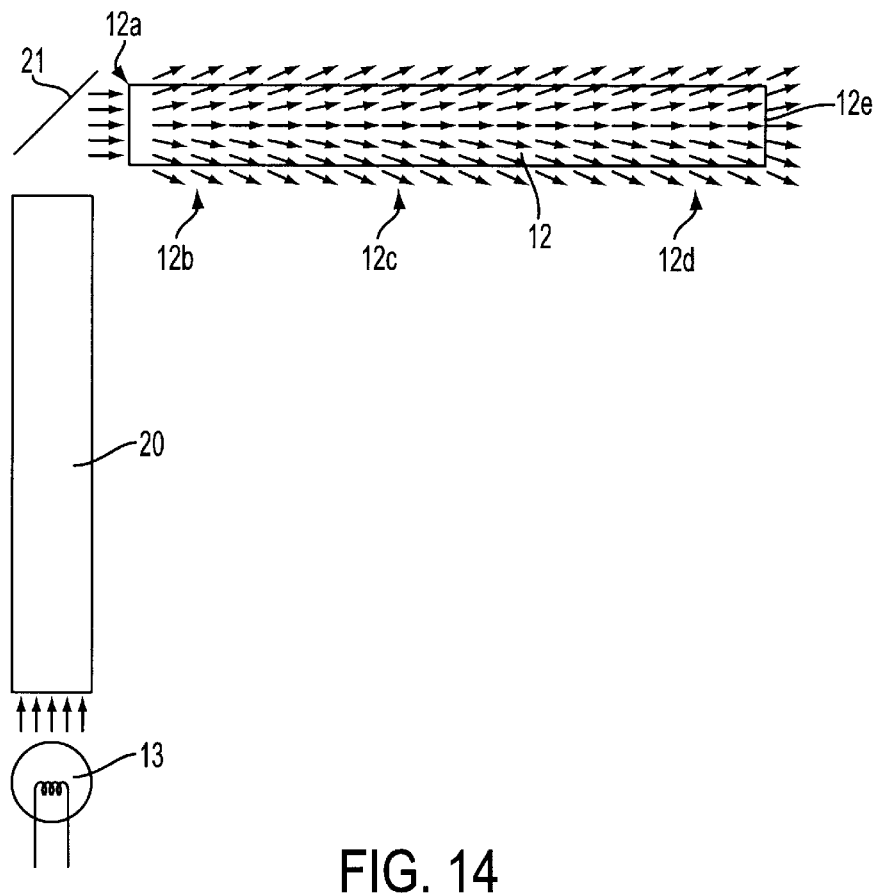
FIG. 14 illustrates an example of a light source device which employs a rod-shaped (e.g. cylindrical-rod-shaped or polygon-rod-shaped) scattering guide; and, FIG. 15 is a graph illustrating color temperature distributions obtained when two kinds of samples of scattering guides were employed in the arrangement shown in FIG. 6, respectively.

FIG. 14 illustrates the second embodiment. In this embodiment, the above-discussed idea is applied to a light source device which employs a rod-shaped (such as cylinder-like or squared-rod-like) scattering guide 12.

The scattering guide 12 has the same composition as the fore-mentioned sample employing EPOSTAR (Registered trade mark) Epo 7 of 7.0 μm in diameter. A cold cathode lamp 13 is, for example, one having spectrum as shown in FIG. 3. Other primary light sources, which provide emission of long and short wavelengths, may be employed.

A transparent guide 20 is disposed as to couple the cold cathode lamp 13 with the scattering guide 12 optically via a mirror 21. Sun light may be supplied to the transparent guide 20 to apply the present invention to natural light illumination. In this embodiment, the scattering guide 12 provides emission from a neighbouring area 12b near to an end face 12a, from an intermediate area 12c, from remote area 12d and from a distal end area 12e, respectively, with color temperature being kept approximately even.

Figure 13:
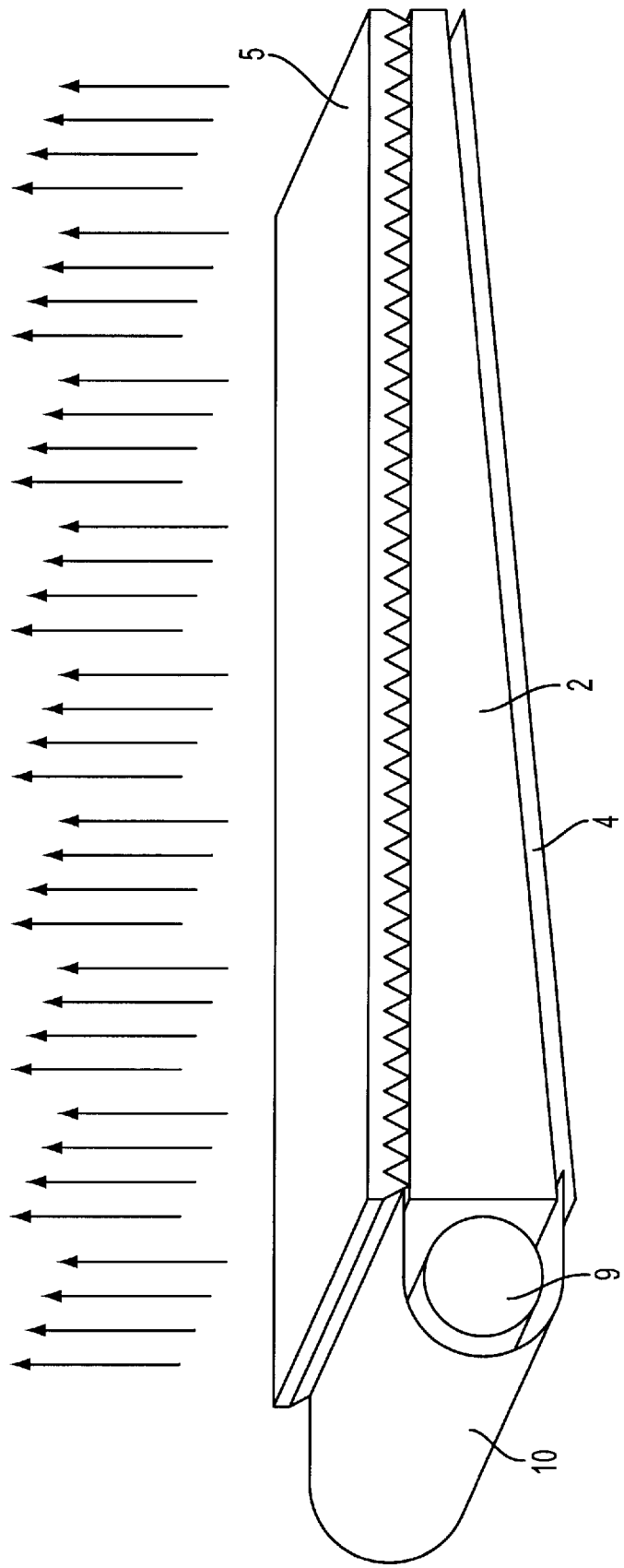
FIG. 13 illustrates an arrangement of a light source device which employs a scattering guide plate with wedge-shaped cross section.

Next, FIG. 13 illustrates the third embodiment which employs a scattering guide plate 2 with wedge-shaped cross section. Since elements are arranged in the same manner as shown in FIG. 1, repeated description is omitted. However, it is to be noted that a single prism sheet is employed. Two prism sheets or double-prism-faced sheet may be employed in modified embodiments.

The scattering guide plate 2 is provided with dimensions, for instance, as follows.

Depth viewed from the cold cathode lamp 9; 68 mm

Width along the cold cathode lamp 9; 85 mm

Thickness at the thickest portion (light supply end); 4.0 mm

Thickness at the thinnest portion (distal end); 0.2 mm

The prism sheet 5 is disposed so that a prismatic surface is directed downward (inward). Prismatic vertical angle of the prismatic surface is 63 degrees to provide emission toward approximately frontal directions.

For compositions of the scattering guide plate 2 employed in this embodiment, the following five samples s to w have been prepared.

s; Epo 6.0 (6 μm in diameter), 0.03 wt % uniform dispersion t; Epo 6.5 (6.5 μm in diameter), 0.03 wt % uniform dispersion u; Epo 7.0 (7.0 μm in diameter), 0.04 wt % uniform dispersion v; Epo 7.5 (7.5 μm in diameter), 0.045 wt % uniform dispersion w; T120 (2.0 μm in diameter), 0.08 wt % uniform dispersion According to FIGS. 9 and 11, values of Q(B)/Q(R) of the respective samples are given as follows.

$Q(B)^s/Q(R)s=0.83$ $Q(B)^t/Q(R)t=0.82$ $Q(B)^u/Q(R)u=1.0$ $Q(B)^v/Q(R)v=1.24$ $Q(B)^w/Q(R)w=1.75$

Figure 12:
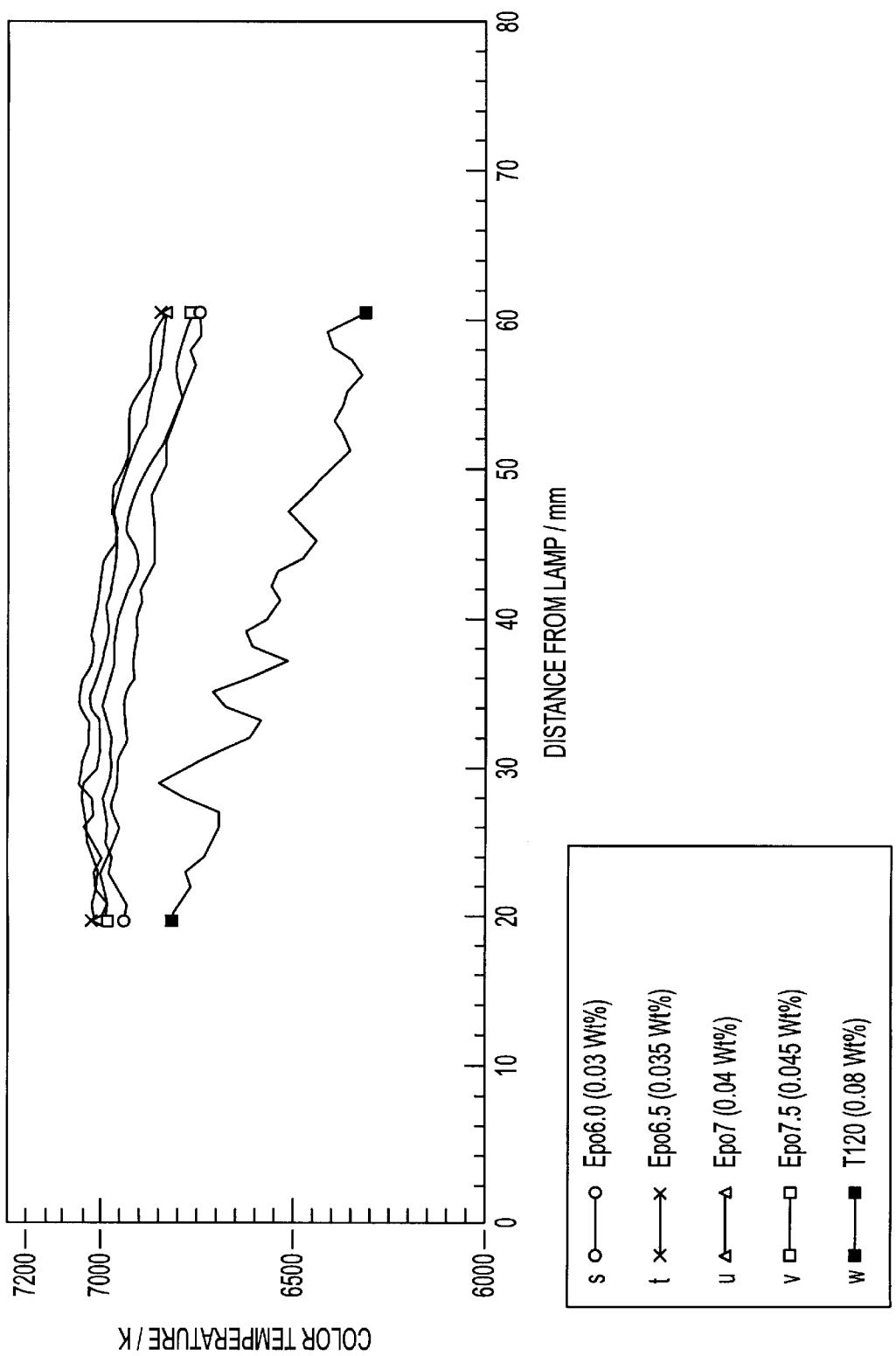
FIG. 12 is a graph showing results of color temperature measurement, which has been carried out for five samples from the frontal direction and in a manner similar to the case of FIG. 6, as a function of distance from the end face to which light supplied.

For these five kinds of samples, in the same measurement manner as the case of FIG. 6, color temperature has been measured from the frontal direction to obtain results as a function depending on distance the end face of light supply side. The results are shown in FIG. 12. As understood from FIG. 12, generally flat color temperature characteristics are realized except for Sample w.

Figure 4:
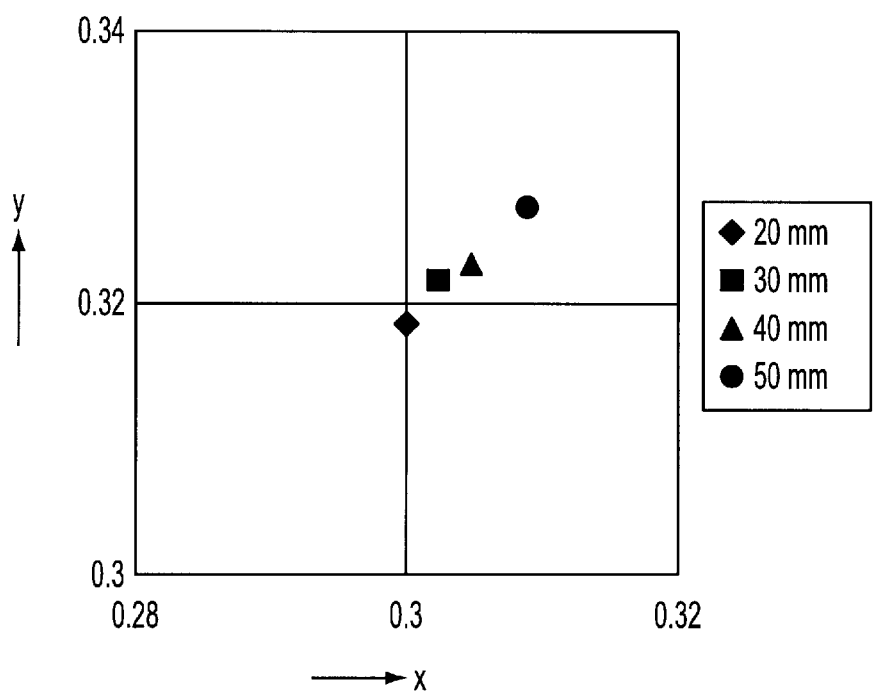
FIG. 4 is a diagram to show color temperature in CIE chromaticity indication for Sample w at four points distancing 20 mm, 30 mm, 30 mm and 40 mm from an end face to which light supplied.

FIG. 4 is a diagram to show color temperature in CIE chromaticity indication for Sample w at four points distancing 20 mm, 30 mm, 30 mm and 40 mm from the end face of light supply side. And FIG. 5 is a diagram to show color temperature in CE chromaticity indication for Sample u at four points distancing 20 mm, 30 mm, 30 mm and 40 mm from the end face of light supply side.

Figure 5:
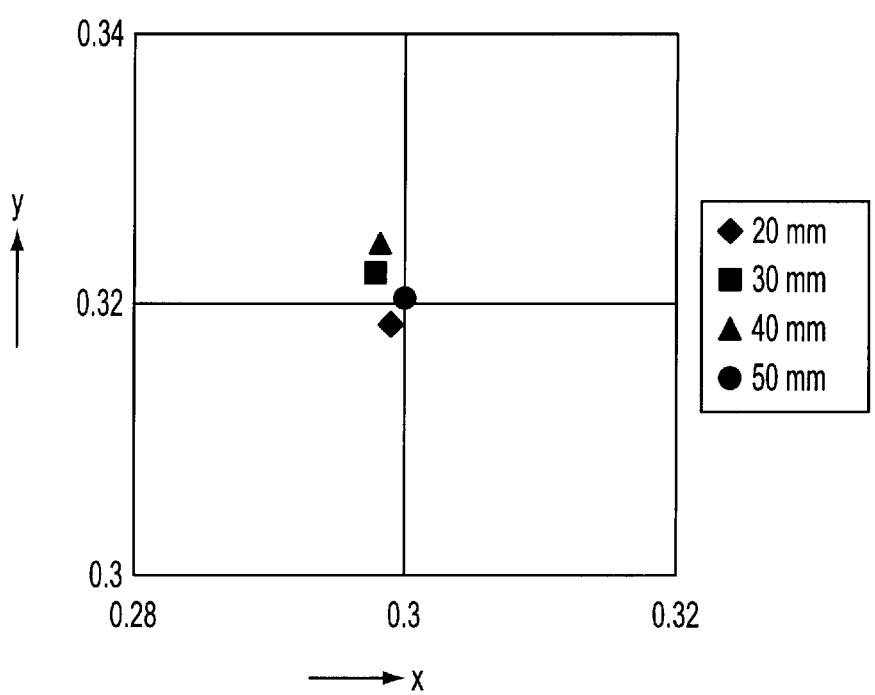
FIG. 5 is a diagram to show color temperature in CIE chromaticity indication for Sample u at four points distancing 20 mm, 30 mm, 30 mm and 40 mm from an end face to which light supplied.

As understood by comparing FIG. 4 with FIG. 5, the former gives a great variation in chromaticity depending on increasing distance from the end face of light supply side while the latter gives only a slight variation in chromaticity according to increasing distance from the end face of light supply side.

The above results lead to an inference that Q(B)/Q(R) falling within a range from about 0.75 to about 1.25 provides conditions under which the principle of the present invention effects practically. This corresponds to regulation of Q(B)/Q(R) within an adjustment range of 0.25 around 1.0. Thus a preferable range of Q(B) /Q(R) in the present invention is expressed by the following relation, $Q(B)/Q(R)=k(0.75 \leq k \leq 1.25)$, where Q(B) is scattering efficiency in a short visible wavelength region represented by blue light and Q(R) is scattering efficiency in a long visible long wavelength region represented by red light.

In the above discussions, inner scattering ability of the scattering guides are given by scatters. However, even if other manners are employed to give inner scattering power to the scattering guides, similar discussions stand up all right. For instance, according to a method without relying upon scatters, pellets having different refractive indices are kneaded and formed into a scattering guide having a designed shape through injection molding or extrusion molding.

In the case of scattering guides produced by means of such a method, "correlation distance" is known as a quantity corresponding to particle diameter. This is an index capable of expressing irregularities in refractive index distributed in matrix and Debye has studied and elucidated correspondence relation with diameter of spherical particles.

Accordingly, Q(B), scattering efficiency in a short wavelength region represented by blue light, and Q(R), scattering efficiency in a long wavelength region represented by red light can be also defined, respectively, for scattering guides produced by means of methods without relying upon scatters. Thus, these scattering guides can be provided with property satisfying the fore-mentioned range formula.

What is claimed is:

1. A light source device comprising a scattering guide provided with scattering ability inside, a light supplier to supply light to an end face portion of said scattering guide, the scattering guide light inside and providing emission from an emission face, wherein said emission face includes at least a part of a side portion of said scattering guide;

said light supplier supplies visible light including rays in a long wavelength region and in a short wavelength region; and said scattering ability of the scattering guide is balance-adjusted for a relation between {Q(R)}, scattering efficiency in the long wavelength region, and {Q(B)}, scattering efficiency in the short wavelength region, so that positions near the end face portion and positions far from the end face portion are approximately equal in color temperature of emission from said emission face;

said relation between {Q(R)} and {Q(B)} being expressed by {Q(B)}/{Q(R)}=(k), where (k) is an adjusting ratio for balance-adjusting and falls within a range $0.75 \leq k \leq 1.25$, where {Q(B)} is scattering efficiency of blue light representing the short wavelength region and {Q(R)} is scattering efficiency of red light representing the long wavelength region.

2. A light source device according to claim 1, wherein said scattering guide has a plate-like shape.

3. A light source device according to claim 2, wherein said scattering guide has a plate-like shape which tends to decrease in thickness according to distance from said end face portion.

4. A light source device according to claim 1, wherein said scattering guide has a rod-like shape.

* * * * *